United States Patent
Ikeda et al.

(10) Patent No.: US 6,475,321 B1
(45) Date of Patent: Nov. 5, 2002

(54) METHOD OF MANUFACTURING ELECTRODE SUBSTRATE

(75) Inventors: Tsutomu Ikeda, Hachioji; Takehiko Kawasaki, Atsugi, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 09/625,550

(22) Filed: Jul. 25, 2000

Related U.S. Application Data

(62) Division of application No. 09/086,459, filed on May 29, 1998, now Pat. No. 6,168,873.

(30) Foreign Application Priority Data

| May 29, 1997 | (JP) | 9-155841 |
| Jun. 4, 1997 | (JP) | 9-161844 |
| Jun. 17, 1997 | (JP) | 9-176316 |

(51) Int. Cl.⁷ .......... B32B 31/20; H01L 23/58; G11B 3/70; G11B 9/00; G11B 9/12
(52) U.S. Cl. .......... 156/230; 156/233; 156/247; 156/289; 427/148; 427/125; 427/126.5; 427/202; 427/96; 428/621; 428/195; 428/914; 257/750; 257/763; 257/766; 257/768; 205/68; 205/78; 369/126; 346/135.1
(58) Field of Search .......... 156/230, 233, 156/239, 240, 247, 289; 427/146, 147, 148, 124, 125, 126.1, 126.5, 96, 202; 428/621, 630, 457, 651, 195, 914; 29/825, 800, 846; 205/68, 67, 78, 69; 369/126, 156; 346/135.1; 257/750, 761, 762, 763, 764, 765, 766, 768

(56) References Cited

U.S. PATENT DOCUMENTS

| 5,358,795 A | 10/1994 | Nakamura et al. | 428/614 |
| 5,432,379 A | 7/1995 | Eguchi et al. | 257/741 |
| 5,626,943 A | 5/1997 | Tenhover | 428/900 |
| 6,308,405 B1 * | 10/2001 | Takamatsu et al. | 29/830 |

FOREIGN PATENT DOCUMENTS

JP 63-161552 7/1988

OTHER PUBLICATIONS

G. Binning, et al.; "Surface Studies by Scanning Tunneling Microscopy", Phys. Rev. Ltrs., vol. 49, No. 1, pp. 57–61, Jul. 1982.

* cited by examiner

Primary Examiner—Jerry A Lorengo
(74) Attorney, Agent, or Firm—Fitzpatrick, Cella, Harper & Scinto

(57) ABSTRACT

An electrode substrate comprises a backing substrate carrying thereon a metal electrode layer and/or a recording layer, the layer or layers having a smooth surface area with a surface roughness of less than 1 nm by more than 1 $\mu m^2$. The smooth surface of the metal electrode layer and/or the recording layer is formed by firstly forming the layer on another substrate having a corresponding smooth surface and then peeling the another substrate off the layer after the layer is bonded to the surface of the backing substrate, whereby the smooth surface profile of the another substrate is transferred to the surface of the layer formed on the backing substrate.

8 Claims, 16 Drawing Sheets

PROIR ART

3101

3102

3103

3104

3106
3105

}3107

METHOD OF MANUFACTURING ELECTRODE SUBSTRATE

This application is a division of application Ser. No. 09/086,459, filed May 29, 1998, now U.S. Pat. No. 6,168,873.

BACKGROUND OF THE INVENTION

1. Field of the Invention

This invention relates to an electrode substrate and a recording medium. It also relates to a method of manufacturing such an electrode substrate and a recording medium.

2. Related Background Art

In recent years, massive efforts have been paid for developing new materials to be used for memories as such materials are deemed to take a vital role for the electronic industry of manufacturing computers, computer-related devices and audio-visual devices such as video discs.

While properties that memory materials are required to have may vary depending on the application, they normally include (1) a highly dense and large memory capacity,
(2) a high response speed for data recording/reproduction,
(3) a low power consumption rate and
(4) a high productivity at low cost.

While semiconductor memories and magnetic memories made of a magnetic or semiconductor material have been in the main stream, low cost and high density recording media such as optical memories using organic thin film made of an organic pigment or a photopolymer are currently on the scene as a result of the remarkable development in the field of laser technologies.

Meanwhile, thanks to the recent development of scanning tunneling microscopes (hereinafter referred to as STM) that allow a direct observation of the electronic structure of surface atoms of a conductor material [G. Binnig et al., Phys. Rev. Lett., 49, 57 (1982)], it is now possible to observe a real spatial image of a specimen with an enhanced level of resolution regardless if the specimen is crystalline or non-crystalline. An STM provides an advantage of low power consumption rate that makes the specimen free from power-related damages in addition to the fact that it can be operated in the atmosphere to observe various specimens and hence provides a wide variety of applications.

The STM utilizes the phenomenon that a tunneling current flows between the metal probe of the STM and the electroconductive specimen when they are brought close to each other until they are separated only by about 1 nm, while applying a voltage to them.

The tunneling current is highly sensitive to changes in the distance separating them. Therefore, various information can be obtained on the real spatial arrangement of the entire electron cloud by operating the scanning probe so as to maintain the tunneling current to a constant level. The intraplanar resolution of an STM is typically about 0.1 nm.

Thus, an ultra-high density data recording/reproduction on the order of the size of an atom (on the order of sub-nanometer) will be possible on the basis of the principle of STM.

For instance, a data recording/reproducing apparatus disclosed in Japanese Patent Application Laid-Open No. 61-80536 utilizes an electron beam to remove particles of atoms adsorbed on the surface of a recording medium in order to write data onto and read data from it by means of an STM.

Methods have been proposed for recording/reproducing data on a material exhibiting memory effects for voltage-current switching characteristics such as a thin film of a n electron type organic compound or a chalcogen compound by means of an STM (see, inter alia, Japanese Patent Applications Laid-Open Nos. 63-161552 and 63-161553).

With any of such methods, it is possible to record data as densely as $10^{12}$ bits/cm$^2$ when the recording bit size is 10 nm.

FIG. 1 of the accompanying drawings schematically illustrates the configuration of a known information processing apparatus utilizing the STM technology. This apparatus will be described briefly below.

Referring to FIG. 1, there are shown a substrate 11, a metal electrode layer 12 and a recording layer 13. There are also shown an XY stage 201, a probe 202, a probe support member 203, a linear actuator 204 for driving the probe in the direction of the Z-axis and a pulse voltage circuit 207.

Reference numeral 301 denotes an amplifier for detecting the tunneling current flowing from the probe 202 to the electrode layer 12 by way of the recording layer 13. Reference numeral 302 denotes a logarithmic compressor for converting the change in the tunneling current into a value proportional to the gap between the probe 202 and the recording layer 13. Reference numeral 303 denotes a low-pass filter for extracting any surface unevenness components of the recording layer 13.

Otherwise, there are shown an error amplifier 304 for detecting the difference between the reference voltage Vref and the output of the low-pass filter 303, a driver 305 for driving the Z-axis linear actuator 204 and a drive circuit 306 for positionally controlling the XY stage 201 by means of X- and Y-axis linear actuators 205 and 206. Reference numeral 307 denotes a high-pass filter for separating data components.

FIG. 2 of the accompanying drawings schematically illustrates a probe 202 to be used with a known recording medium.

Referring now to FIG. 2, there are shown data bits 401 stored in the recording layer 13 and crystal grains 402 produced when the electrode layer 12 is formed on the substrate 11. The crystal grains have a size of about 30 to 50 nm if the electrode layer 12 is formed by means of commonly used techniques such as vacuum evaporation or sputtering.

The gap between the probe 202 and the recording layer 13 can be held to a constant value by means of the circuit shown in FIG. 1. More specifically, the tunneling current flowing between the probe 202 and the recording layer 13 is detected and, after passing through the logarithmic compressor 302 and the low-pass filter 303, compared with a reference voltage. Then, the Z-axis linear actuator 204 supporting the probe 202 is driven to reduce the difference between the detected value and the reference value to zero and thereby maintain the distance between the probe 202 and the recording layer 13 to a constant value.

Then, the XY stage 201 is driven to make the probe 202 move along the surface of the recording medium so that the data stored in the recording layer 13 can be detected at point b by separating the high frequency component of the signal obtained at point a in FIG. 1.

FIG. 3 of the accompanying drawings is a graph showing the signal intensity spectrum relative to the frequency of the signal obtained at point a in FIG. 1. Note that the signal portion below f0 represents the mild undulations of the surface of the recording medium due to warps and distortions of the substrate 11 and the part of the signal at and around f1 represents the surface roughness of the recording layer 13 mainly due to crystal grains 402 produced at the time of forming the electrode material and the signal portion at f2 represents the carrier wave component of the recorded data. Reference numeral 403 denotes the data signal band.

Reference symbol f3 denotes the part of the signal for which the atomic and molecular arrangement of the recording layer 13 is responsible.

However, a known recording medium having a configuration as described above is typically accompanied by the following problems.

For a high density recording to be done by exploiting the high resolution of an STM, the data signal band 403 should be found between f1 and f3.

Then, a high-pass filter 307 relevant to cut-off frequency fc is used to separate the data component of the signal.

However, the data signal band 403 lies on the outskirt of the signal component represented by f1 mainly due to the fact that crystal grains 402 of the electrode layer 12 is responsible for the signal component f1 and the size of the crystal grains 402 that is about 30 to 50 nm is close to the recorded data size and the bit interval which are about 1 to 10 nm.

A net consequence of this is a low S/N ratio for data reproduction and a high error rate for data reading.

SUMMARY OF THE INVENTION

Therefore, it is an object of the present invention to provide an electrode substrate and a recording medium showing a high S/N ratio and adapted to high speed data reproduction by solving the problems of the prior art. Another object of the present invention is to provide a method of manufacturing such an electrode substrate and a recording medium.

According to an aspect of the invention, the above first object is achieved by providing a substrate comprising a metal electrode layer and/or a recording layer, wherein said metal electrode layer and/or said recording layer have a smooth surface area with a surface roughness of less than 1 nm by more than 1 $\mu m^2$.

According to another aspect of the invention, there is provided a method of manufacturing an electrode substrate having a metal electrode layer comprising steps of:

forming a metal electrode layer on a first substrate having a smooth surface; and peeling said first substrate off said metal electrode layer, transferring the smooth surface profile of said first substrate to the surface of said metal electrode layer.

According to still another aspect of the invention, there is provided a method of manufacturing a recording medium having a metal electrode layer comprising a step of:

forming a recording layer on a metal electrode layer of an electrode substrate prepared by the above manufacturing method.

According to still another aspect of the invention, there is also provided a method of manufacturing a recording medium comprising steps of:

forming a recording layer on a first substrate having a smooth surface; and peeling said first substrate off said recording layer, transferring the smooth surface profile of said first substrate to the surface of said recording layer.

DESCRIPTION OF THE PREFERRED EMBODIMENTS (First Mode of Carrying Out the Invention)

Now, the present invention will be described by referring to the accompanying drawings that illustrate preferred modes of carrying out the invention.

FIGS. 4A through 4G are schematic cross sectional views of a recording medium prepared according to a first mode of carrying out the invention, the recording medium being shown in different manufacturing steps.

Figure 4A:
FIGS. 4A, 4B, 4C, 4D, 4E, 4F and 4G are schematic cross sectional views of a recording medium prepared according to a first mode of carrying out the invention, shown in different manufacturing steps.

FIG. 4A shows a first substrate 101. The substrate is required to have a smooth surface area greater than 1 $\mu m^2$ where surface roughness does not exceed 1 nm.

The surface roughness can be determined by means of atomic force microscopy (hereinafter referred to as AFM).

With AFM, the surface of the specimen can be observed with a level of resolution on the order of the size of an atom regardless if the specimen is electroconductive or not.

As a result of a series of researches, the inventors of the present invention found that materials that can suitably be used for the first substrate 101 according to the invention include the following.

(1) cleavage plane of a crystal . . . A cleavage plane of a crystal provides a very smooth surface. Materials that can be used to provide a crystal having a cleavage plane for the purpose of the invention include MgO, TiC, Si, mica and HOPG.

(2) surface of molten glass . . . Glass materials that can be used to provide a very smooth surface of molten glass for the purpose of the invention include float glass and #7059 fused quartz.

(3) others . . . For example, a thermal oxide film of Si formed on a sufficiently smooth surface of an Si wafer can be used to provide a very smooth surface for the purpose of the invention.

Figure 4B:

Then, a metal electrode layer 102 is formed on the first substrate 101 as shown in FIG. 4B.

The metal electrode layer 102 is preferably made of a highly electroconductive metal that does not adhere positively to the first substrate 101. Materials that can be used for the metal electrode layer 102 include noble metals such as Pt, Pd, Ir, Rh, Ru and Au and alloys of any of them as well as laminates of such materials. Any known thin film forming technique may be used for forming a thin film for the metal electrode layer for the purpose of the invention.

Figure 4C:

Subsequently, a metal layer 104 is formed on a second substrate 103 as shown in FIG. 4C.

Figure 4D:

Any metal that can effectively bond the second substrate 103 and a bonding layer 105 of a metal may be used for the layer 104. Metal materials that can be used for the layer 104 include Ti, Cr, W and Ta. Then, the bonding layer 105 of a metal is formed on the metal layer 104 as shown in FIG. 4D.

Additionally, another bonding layer 105 of a metal may be formed on the metal electrode layer 102.

Metal materials that can be used for the bonding layer 105 include noble metals such as Au, Pt, Pd, Ir, Rh and Ru and alloys of any of them as well as laminates of such materials. The use of Au is particularly desirable because it is soft and has a low melting point.

If a bonding layer 105 of Au is formed both on the metal layer 104 and the metal electrode layer 102, the layers can be bonded together under low pressure at relatively low temperature.

Figure 4E:
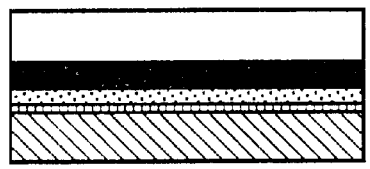

Then, as shown in FIG. 4E, the first and second substrates are put together with the sides carrying respective metal layers facing each other and high pressure is applied to them to bond the layers. While the pressure has no specific limit, it is typically between several and tens of several kg/cm$^2$.

The bonding operation may be conducted under relatively low pressure if the layers are heat treated.

While the temperature of the heat treatment may vary as a function of the pressure involved, it is typically below 1,000° C. The heat treatment and the pressurization are preferably conducted simultaneously, although the two operations may be carried out separately.

Figure 4F:
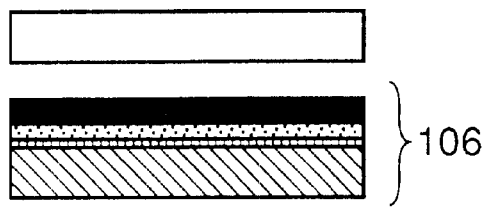

Thereafter, as shown in FIG. 4F, an electrode substrate 106 is produced as the first substrate 101 is peeled off the interface of the first substrate 101 and the metal electrode layer 102.

The electrode substrate 106 has a surface smoothness on the surface of the metal electrode layer 102 equal to that of the first substrate 101 and hence a smooth surface area greater than 1 $\mu m^2$ where surface roughness does not exceed 1 nm.

Figure 4G:
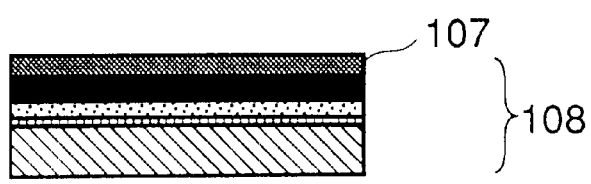

Subsequently, a recording medium 108 is produced by forming a recording layer 107 on the metal electrode layer 102 as shown in FIG. 4G.

Such a recording layer 107 can be formed on the metal electrode layer 102 as a layer of a material that can exhibit a memory switching phenomenon (electric memory effect) for the current-voltage characteristics as disclosed in Japanese Patent Application Laid-Open No. 63-161552. For example, a recording layer may be formed on the metal electrode layer 102 as an organic monomolecular film of molecules including both a group having a π-electron level and a group having only a σ-electron level or a built-up film comprising a number of such monomolecular films typically prepared by means of an LB (Langmuir-Blodgett) technique. Since an organic monomolecular film of such molecules or a built-up film of such monomolecular films can accurately reproduce the surface smoothness of the substrate, the surface smoothness of the recording layer is substantially equal to that of the metal electrode layer 102.

Figure 1:
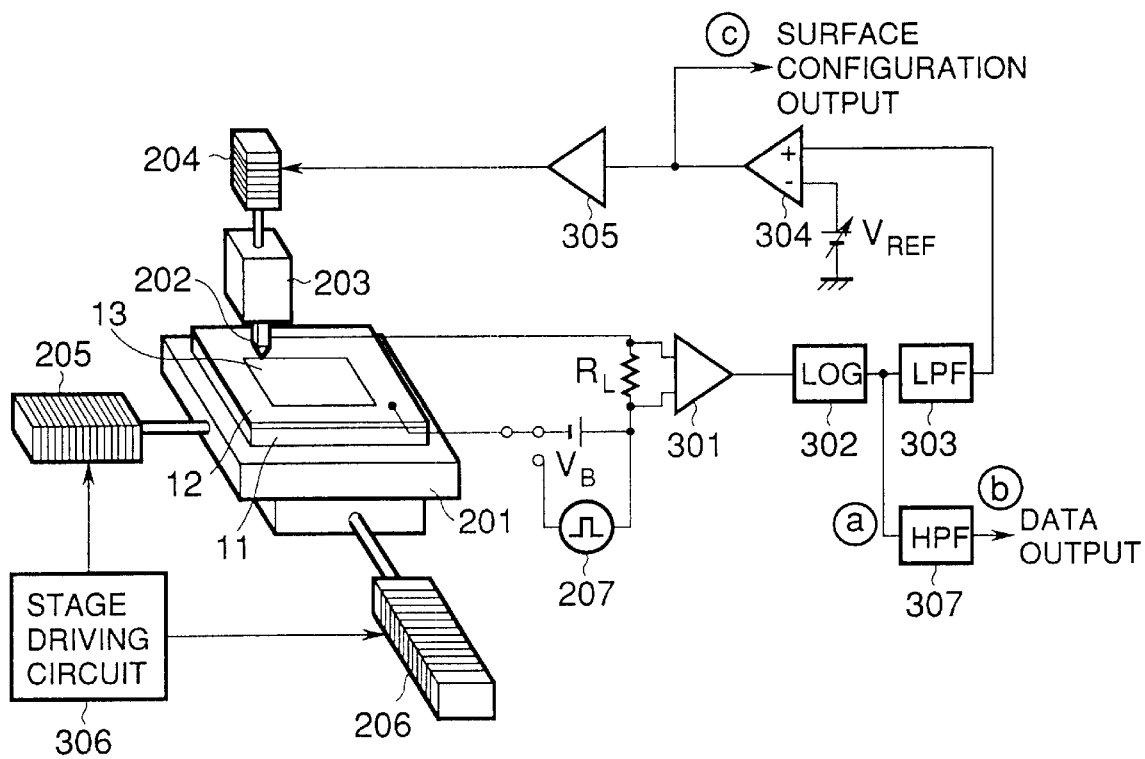
FIG. 1 is a schematic illustration of the configuration of a known information processing apparatus utilizing the STM technology.
Figure 2:
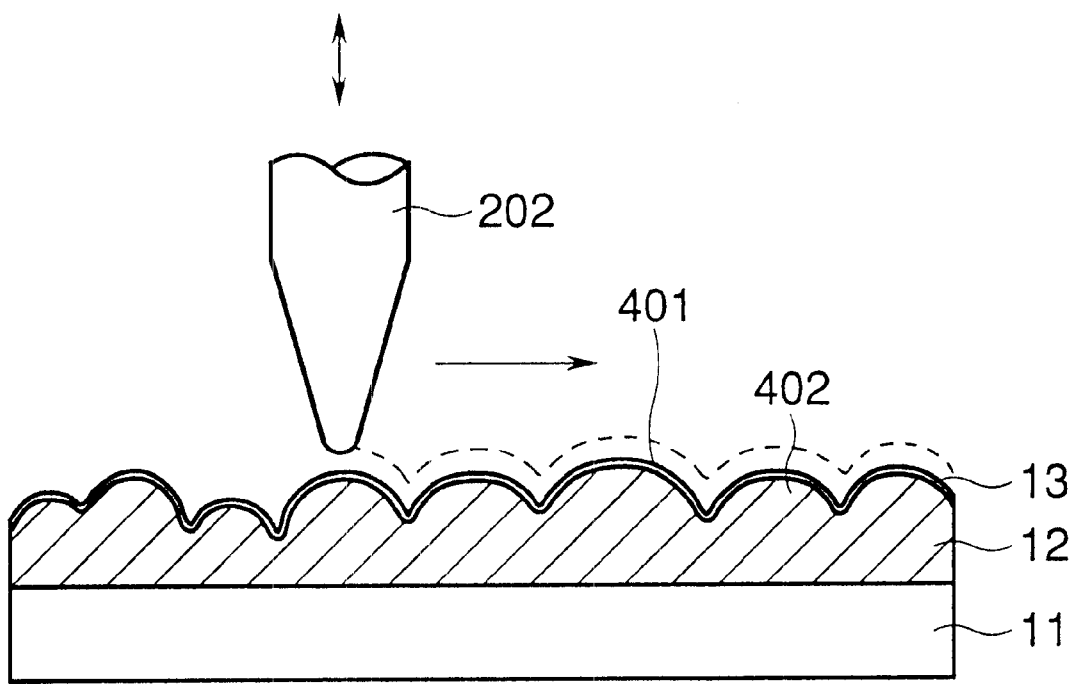
FIG. 2 is a schematic cross sectional view of a known recording medium.
Figure 3:
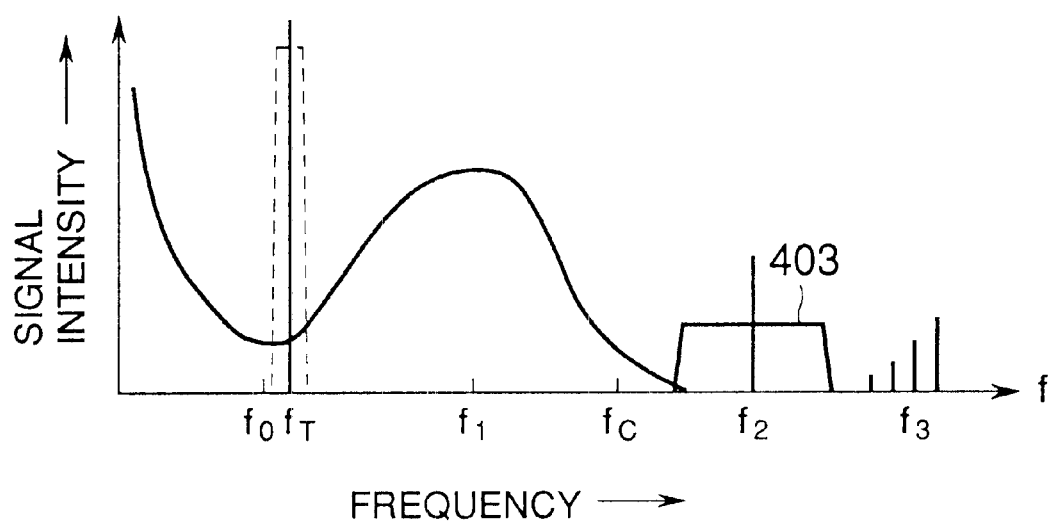
FIG. 3 is a graph showing a frequency spectrum of a reproduced signal of the prior art.
Figure 5A:
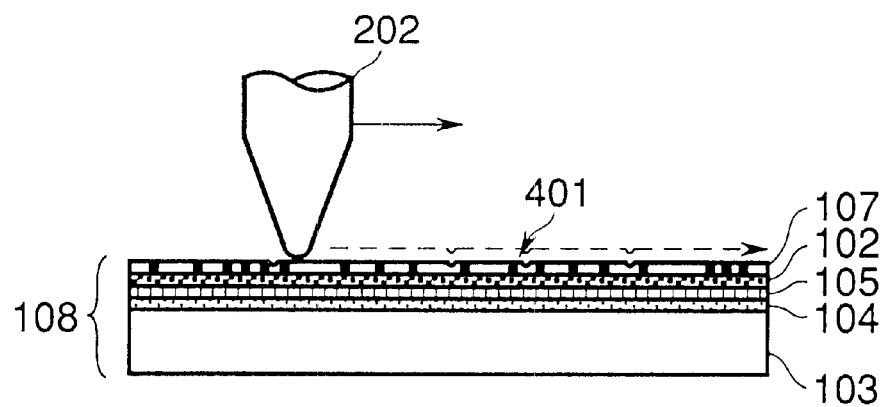
FIG. 5A is a schematic cross sectional view of a first embodiment of recording medium according to the invention and FIG. 5B is a graph showing a frequency spectrum of a signal reproduced from the recording medium of FIG. 5A.
Figure 5B:
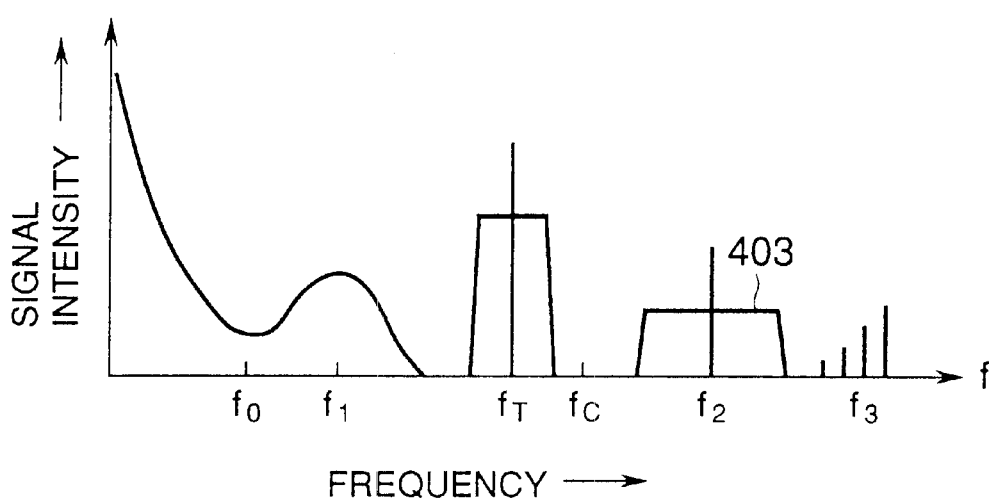

FIGS. 5A and 5B respectively show a schematic cross sectional view of a first embodiment of recording medium 108 according to the invention and a probe used for an information processing apparatus as shown in FIG. 1 and a graph illustrating the frequency spectrum of a signal obtained at point a in FIG. 1.

Note that the signal portion below f0 represents the mild undulations of the surface of the recording medium due to warps and distortions of the recording medium 108.

The signal portion at f2 represents the carrier wave component of the recorded data and reference numeral 403 denotes the data signal band. Reference symbol f3 denotes the part of the signal for which the atomic and molecular arrangement of the recording layer 107 is responsible.

The part of the signal at and around f1 represents the fine surface roughness of the metal electrode layer 102 transferred from the surface of the first substrate 101, that are made smaller than the signal to be used for recording data, or 1 nm when the signal is used for recording/reproducing data by means of an STM.

A recording medium having a configuration as described above provides the following effects.

The effects due to the excellent surface smoothness include the following.

(1) The signal component f1 attributable to the surface roughness of the recording layer 107 does not come to lie on the data signal band 403 so that the broadening of f1 in the spectrum does not adversely affect the S/N ratio of data. In other words, the recording medium can reduce the data error rate.

(2) Since the surface of the recording layer 107 is practically free from significant surface roughness, the probe 202 is moved little along the Z-axis during an XY scanning operation to keep the distance between the surface of the recording layer 107 and the probe 202. Therefore, the XY stage 201 can be driven to move very fast.

Additionally, a method of manufacturing an electrode substrate according to the invention provides the following advantages.

(1) A highly heat-resistive electrode substrate can be prepared because metal is used for a bonding layer. Therefore, layers such as a recording layer can be formed on the electrode substrate, keeping the surface very smooth, at temperatures by far higher than the temperature range used for the prior art.

(2) Since a thin metal film layer is used as bonding layer, oozing out of adhesives from the surfaces to be bonded together is eliminated, which is often experienced in its counterpart of the prior art using an organic adhesive agent applied to the surfaces.

(3) The use of the thin metal film layer that operates as bonding layer makes it easy to control the height of the surface of the metal electrode layer from the surface of the substrate carrying the layer thereon and the parallelism of the surface of the substrate and that of the electrode layer if compared with its counterpart of the prior art, which uses typically an organic adhesive agent applied to the surfaces.

(4) Any substrate material can be used if it is adapted to form a bonding layer via a metal layer, whereby a smooth metal electrode layer is formed.

Now, a method of smoothing the surface of crystalline gold surface for the purpose of the invention will be described by way of examples.

EXAMPLE 1

This example will be described by referring to FIGS. 4A through 4G.

Firstly, a first substrate 101 was prepared from a piece of float glass having a satisfactory surface smoothness as shown in FIG. 4A.

Then, as shown in FIG. 4B, Au and Pt were sputtered concurrently on the first substrate 101 to produce a metal electrode layer 102 on the first substrate 101. The electrode layer 102 was made of an alloy of Au and Pt containing them to a ratio of 1:1 and had a film thickness of 300 nm. Subsequently, a bonding layer 105 of Au was formed on the metal electrode layer 102 to a film thickness of 100 nm.

Thereafter, as shown in FIG. 4C, a metal layer 104 of Cr was formed on a second substrate 103 of an Si wafer to a film thickness of 5 nm and then, as shown in FIG. 4D, another bonding layer 105 of Au was formed on the metal layer 104 to a film thickness of 100 nm.

Then, as shown in FIG. 4E, the bonding layer on the first substrate 101 and that of the second substrate 103 were put together, applying pressure to the substrates. The applied pressure was 5 kg/cm$^2$. Thereafter, the substrates were heated to 250° C. for 1 minutes, while keeping the pressure being applied to them and then cooled to room temperature.

Subsequently, the first substrate 101 was peeled off at the interface with the metal electrode layer 102 to produce an electrode substrate 106 having a very smooth surface as shown in FIG. 4F. When the electrode surface of the obtained electrode substrate 106 was observed through an STM, the surface roughness per 1 $\mu$m$^2$ was less than 0.5 nm.

Thereafter, as shown in FIG. 4G, a polyimide LB film was formed on the surface of the electrode substrate 106 as a recording layer 107 to finish the operation of preparing a recording medium 108.

A method as disclosed in Japanese Patent Application Laid-Open No. 63-161552 was used to prepare the polyimide LB film. More specifically, octadecylamine salt of polyamidoic acid was used as material and a total of six monomolecular layers of the compound were formed on the electrode surface, which layers were then baked at 380° C. for 20 minutes to produce a polyimide recording layer.

When the surface of the obtained recording layer was observed by AFM, it was confirmed that the surface roughness per 1 $\mu$m$^2$ was less than 0.5 nm.

Then, the specimen was subjected to a recording/reproducing test.

A probe made of Pt/Rh was used for the probe 202. The probe 202 was controlled by means of a piezoelectric element for its fine movement of regulating the distance Z down to the surface of the recording layer 107 in order to make a constant current flow therethrough. The linear actuators 204, 205 and 206 were also designed to possibly control the fine movement of the probe 202 along an XY plane, while keeping the distance Z between the probe 202 and the surface of the recording layer 107 to a constant value. The recording medium 108 was placed on the XY stage.

Then, a voltage of +1.5V was applied between the probe 202 and the electrode layer 102 of the recording medium and the distance Z between the probe 202 and the recording layer 107 was regulated, monitoring the electric current flowing therethrough. The electric current Ip for controlling the distance Z between the probe 202 and the surface of the recording layer 107 as selected to be $10^{-10} \leq Ip \leq 10^{-11}$. Thereafter, the probe 202 was caused to scan the recording layer 107 from above and record data continuously at a pitch of 20 nm by applying a rectangular pulse voltage, using the probe as positive electrode and the electrode layer as negative electrode.

Subsequently, the recorded bits were scanned from above to find that an electric current of about 10 nA flowed on each bit.

The error rate of the read out data was determined, using a constant data reading rate to find that it was as low as $10^{-7}$ if compared with the average error rate of about $10^{-4}$ of the prior art.

EXAMPLE 2

This example will be described by referring to FIGS. 6A through 6G of the accompanying drawings.

Figure 6A:
FIGS. 6A, 6B, 6C, 6D, 6E, 6F and 6G are schematic cross sectional views of a recording medium prepared similarly to FIGS. 4A through 4G, shown in different manufacturing steps.

Firstly, a first substrate 101 was prepared by thermally oxidizing an Si wafer having a satisfactory surface smoothness and then forming an Si oxide film on it to a thickness of 100 nm as shown in FIG. 6A.

Figure 6B:
Figure 6C:
Figure 6D:

Then, as shown in FIG. 6B, Au and Pd were sputtered concurrently on the first substrate 101 to produce a metal electrode layer 102 on the substrate 101. The electrode layer 102 was made of an alloy of Au and Pd containing them to a ratio of 1:1 and had a film thickness of 500 nm. Subsequently, a bonding layer 105 of Au was formed on the metal electrode layer 102 to a film thickness of 100 nm as shown in FIG. 6C. Then, as shown in FIG. 6D, a metal layer 104 of Cr was formed on a second substrate 103 of an Si wafer to a film thickness of 5 nm and then a bonding layer 105 of Au was formed on the metal layer 104 to a film thickness of 100 nm.

Figure 6E:
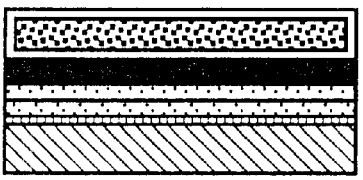

Then, as shown in FIG. 6E, the bonding layer on the first substrate 101 and that of the second substrate 103 were put together, applying pressure to the substrates. The applied pressure was 10 kg/cm$^2$. Thereafter, the substrates were heated to 250° C. for 1 minute, while keeping the pressure being applied to them and then cooled to room temperature.

Figure 6F:
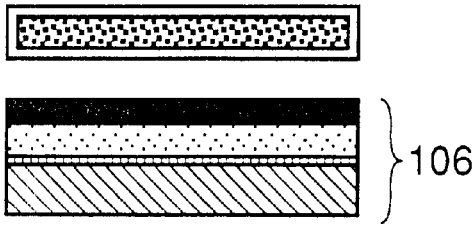

Subsequently, the first substrate 101 was peeled off at the interface with the metal electrode layer 102 to produce an electrode substrate 106 having a very smooth surface as shown in FIG. 6F. When the electrode surface of the obtained electrode substrate 106 was observed through an STM, the surface roughness per 1 $\mu$m$^2$ was less than 0.4 nm.

Figure 6G:
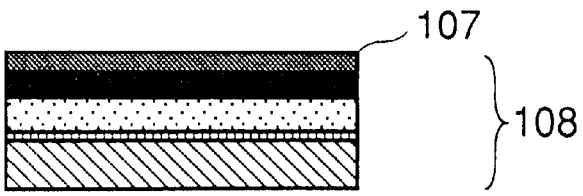

Thereafter, as in the case of Example 1, a polyimide LB film was formed on the surface of the electrode substrate 106 as a recording layer 107 to finish the operation of preparing a recording medium 108 (FIG. 6G).

When the surface of the obtained recording layer was observed by AFM, it was confirmed that the surface roughness per 1 $\mu m^2$ was less than 0.4 nm.

Then, the specimen was subjected to a recording/reproducing test as in the case of Example 1 and the error rate of the read out data was determined, using a constant data reading rate to find that it was as low as $10^{-7}$ if compared with the average error rate of about $10^{-4}$ of the prior art.

EXAMPLE 3

This example will be described also by referring to FIGS. 6A through 6G of the accompanying drawings.

Firstly, a first substrate 101 was prepared by thermally oxidizing an Si wafer having a satisfactory surface smoothness and then forming an Si oxide film on it to a thickness of 100 nm as shown in FIG. 6A.

Then, as shown in FIG. 6B, Ir was sputtered on the first substrate 101 to produce a metal electrode layer 102 of Ir on the first substrate 101. More specifically, the metal electrode layer 102 was formed at a deposition rate of 0.2 nm/sec to a film thickness of 300 nm.

Subsequently, a bonding layer 105 of Au was formed on the metal electrode layer 102 at a deposition rate of 0.5 nm/sec to a film thickness of 300 nm as shown in FIG. 6C.

Then, as shown in FIG. 6D, a metal layer 104 of Ti was formed on a second substrate 103 of an Si wafer to a film thickness of 5 nm and then a bonding layer 105 of Au was formed on the metal layer 104 at a deposition rate of 0.5 nm/sec to a film thickness of 200 nm.

Then, as shown in FIG. 6E, the bonding layer on the first substrate 101 and that of the second substrate 103 were put together, applying pressure to the substrates. The applied pressure was 20 kg/cm$^2$.

Subsequently, the first substrate 101 was peeled off at the interface with the metal electrode layer 102 to produce an electrode substrate 106 having a very smooth surface as shown in FIG. 6F. When the electrode surface of the obtained electrode substrate 106 was observed through an STM, the surface roughness per 1 m$^2$ was less than 0.5 nm.

Thereafter, as in the case of Example 1, a polyimide LB film was formed on the surface of the electrode substrate 106 as a recording layer 107 to finish the operation of preparing a recording medium 108 (FIG. 6G).

When the surface of the obtained recording layer was observed by AFM, it was confirmed that the surface roughness per 1 $\mu m^2$ was less than 0.5 nm.

Then, the specimen was subjected to a recording/reproducing test as in the case of Example 1 and the error rate of the read out data was determined, using a constant data reading rate to find that it was as low as $10^{-7}$ if compared with the average error rate of about $10^{-4}$ of the prior art.

EXAMPLE 4

This example will be described by referring to FIGS. 7A through 7F of the accompanying drawings.

Figure 7A:
FIGS. 7A, 7B, 7C, 7D, 7E and 7F are schematic cross sectional views of a recording medium prepared similarly to FIGS. 4A through 4G, shown in different manufacturing steps.

Firstly, a first substrate 101 was prepared by thermally oxidizing an Si wafer having a satisfactory surface smoothness and then forming an Si oxide film on it to a thickness of 100 nm as shown in FIG. 7A.

Figure 7B:
Figure 7C:

Then, as shown in FIG. 7B, Pt was sputtered on the first substrate 101 to produce a metal electrode layer 102 of Pt on the first substrate 101. More specifically, the metal electrode layer 102 was formed to a film thickness of 500 nm. Subsequently, a bonding layer 105 of Al was formed on the metal electrode layer 102 to a film thickness of 100 nm as shown in FIG. 7C.

Figure 7D:
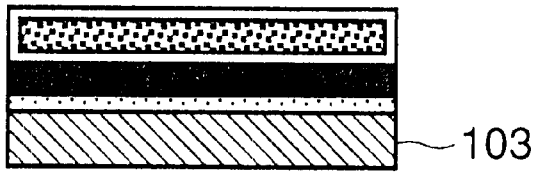
Figure 7E:
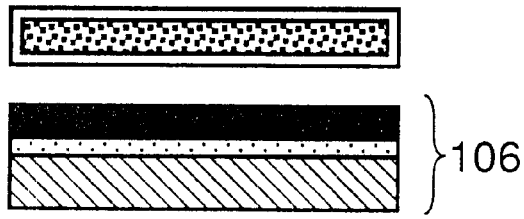

Then, as shown in FIG. 7D, the bonding layer on the first substrate and the surface of a second substrate 103 of glass were put together, applying pressure to the substrates. The applied pressure was 5 kg/cm$^2$. Thereafter, the substrates were heated to 500° C. for 1 minute, while keeping the pressure being applied to them and then cooled to room temperature. Subsequently, the first substrate 101 was peeled off at the interface with the metal electrode layer 102 to produce an electrode substrate 106 having a very smooth surface as shown in FIG. 7E. When the electrode surface of the obtained electrode substrate 106 was observed through an STM, the surface roughness per 1 $\mu m^2$ was less than 0.5 nm.

Figure 7F:
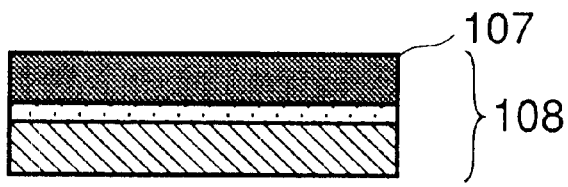

Thereafter, as in the case of Example 1, a polyimide LB film was formed on the surface of the electrode substrate 106 as a recording layer 107 to finish the operation of preparing a recording medium 108 (FIG. 7F).

When the surface of the obtained recording layer was observed by AFM, it was confirmed that the surface roughness per 1 $\mu m^2$ was less than 0.5 nm.

Then, the specimen was subjected to a recording/reproducing test as in the case of Example 1 and the error rate of the read out data was determined, using a constant data reading rate to find that it was as low as $10^{-7}$ if compared with the average error rate of about $10^{-4}$ of the prior art.

(Second Mode of Carrying Out the Invention)

Now, the present invention will be described in terms of a second mode of carrying it out.

Figure 8:
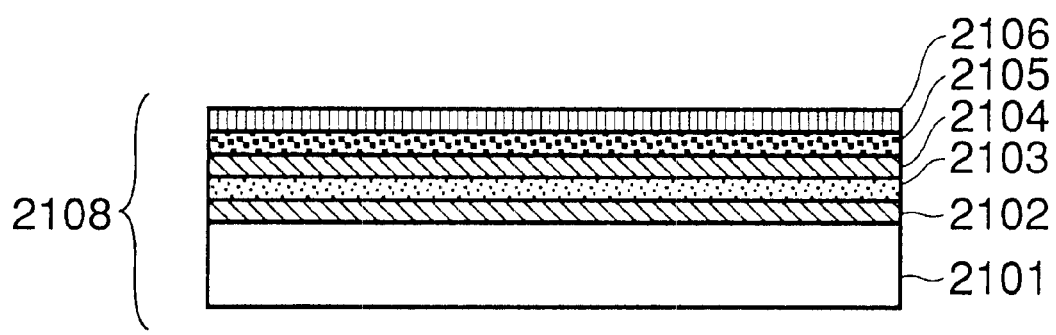
FIG. 8 is a schematic cross sectional view of a second embodiment of recording medium according to the invention.

FIG. 8 is a schematic cross sectional view of an electrode substrate and a recording medium prepared according to a second mode of carrying out the invention.

There are shown a substrate 2101, an adherent layer 2102, a high thermal conduction layer 2103, a low thermal expansion layer 2104, a metal electrode layer 2105 and a recording layer 2106. A recording medium 2108 comprises these layers.

FIGS. 9A through 9J schematically show cross sectional views of a recording medium in different manufacturing steps, which is prepared according to the second mode of the invention.

Figure 9A:
FIGS. 9A, 9B, 9C, 9D, 9E, 9F, 9G, 9H, 9I and 9J are schematic cross sectional views of a recording medium prepared according to a second mode of carrying out the invention, shown in different manufacturing steps.

FIG. 9A shows a first substrate 2109. The substrate is required to have a smooth surface area greater than 1 $\mu m^2$ where surface roughness does not exceed 1 nm.

The surface roughness can be determined by means of atomic force microscopy (hereinafter referred to as AFM). With AFM, the surface of the specimen can be observed with a level of resolution on the order of the size of an atom regardless if the specimen is electroconductive or not. As a result of a series of researches, the inventors of the present invention found that materials that can suitably be used for the first substrate 2109 according to the invention include the following.

(1) cleavage plane of a crystal . . . A cleavage plane of a crystal provides a very smooth surface. Materials that can be used to provide a crystal having a cleavage plane for the purpose of the invention include MgO, TiC, Si, mica and HOPG.

(2) surface of molten glass . . . Glass materials that can be used to provide a very smooth surface of molten glass for the purpose of the invention include float glass and #7059 fused quartz.

(3) others . . . For example, a thermal oxide film of Si formed on a sufficiently smooth surface of an Si wafer can be used to provide a very smooth surface for the purpose of the invention.

Figure 9B:

Then, a metal electrode layer 2105 is formed on the first substrate 2109 as shown in FIG. 9B. The metal electrode layer 2105 is preferably made of a highly electroconductive metal that does not adhere positively to the first substrate 2109.

Materials that can be used for the metal electrode layer include noble metals such as Pt, Pd, Ir, Rh, Ru and Au and alloys of any of them as well as laminates of such materials. Any known thin film forming technique may be used for forming a thin film for the metal electrode layer for the purpose of the invention.

Figure 9C:
Figure 9D:

Subsequently, a low thermal expansion layer 2104 is formed on the metal electrode layer 2105 as shown in FIG. 9C. Materials that can preferably be used for the low thermal expansion layer include W, Ta, Mo, Cr, Ti and Zr, alloys of any of them and their compounds. Then, as shown in FIG. 9D, a high thermal conduction layer 2103 is formed on the low thermal expansion layer 2104. Materials that can preferably be used for the high thermal conduction layer include Au, Ag, Cu, Al and alloys of any of them.

Figure 9E:

Thereafter, an adherent layer 2102 is formed on a second substrate 2101 to operate as an electrode wiring member as shown in FIG. 9E.

Any metal that can effectively bond the second substrate 2101 and the high thermal conduction layer 2103 may be used for the adherent layer 2102. Metal materials that can be used for the layer include Ti, Cr, W and Ta.

Figure 9F:
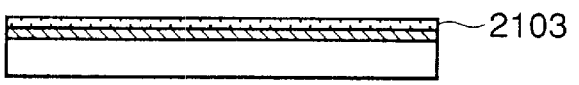

Then, a high thermal conduction layer 2103 is formed on the low thermal expansion layer 2104 as shown in FIG. 9F.

Figure 9G:
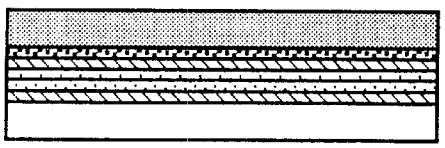
Figure 9H:
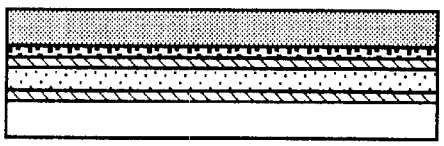

Then, as shown in FIGS. 9G and 9H, the first and second substrates are put together with the sides carrying respective metal layers facing each other and high pressure is applied to them to bond the layers. While the pressure has no specific limit, it is typically between several and tens of several kg/cm$^2$.

The bonding operation may be conducted under relatively low pressure if the layers are heat treated. While the temperature of the heat treatment may vary as a function of the pressure involved, it is typically below 1,000° C. The heat treatment and the pressurization are preferably conducted simultaneously, although the two operations may be carried out separately.

Figure 9I:
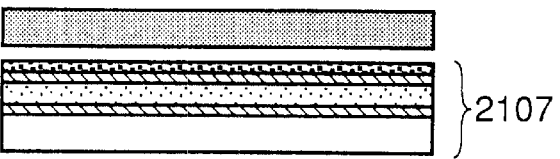

Thereafter, as shown in FIG. 9I, an electrode substrate 2107 is produced as the first substrate 2109 is peeled off the interface of the first substrate 2109 and the metal electrode layer 2105.

The electrode substrate 2107 has a surface smoothness on the surface of the metal electrode layer 2105 equal to that of the first substrate 2109 and hence a smooth surface area greater than 1 $\mu m^2$ where surface roughness does not exceed 1 nm.

Figure 9J:
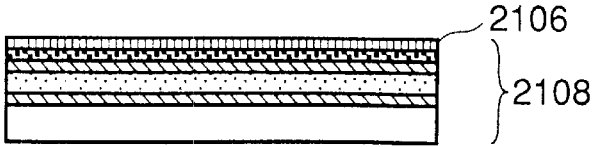

Subsequently, a recording medium 2108 is produced by forming a recording layer 2106 on the metal electrode layer 2105 as shown in FIG. 9J.

Such a recording layer 2106 can be formed on the metal electrode layer 2105 as a layer of a material that can exhibit a memory switching phenomenon (electric memory effect) for the current-voltage characteristics as disclosed in Japanese Patent Application Laid-Open No. 63-161552. For example, a recording layer may be formed on the metal electrode layer 2105 as an organic monomolecular film of molecules including both a group having a $\pi$-electron level and a group having only a $\sigma$-electron level or a built-up film comprising a number of such monomolecular films typically prepared by means of an LB (Langmuir-Blodgett) technique. Since an organic monomolecular film of such molecules or a built-up film of such monomolecular films can accurately reproduce the surface smoothness of the substrate, the surface smoothness of the recording layer is substantially equal to that of the metal electrode layer 2105.

Additionally, according to this mode of carrying out the invention, a recording medium can be formed on a substrate as a metal laminate in the form of islands.

Figure 10:
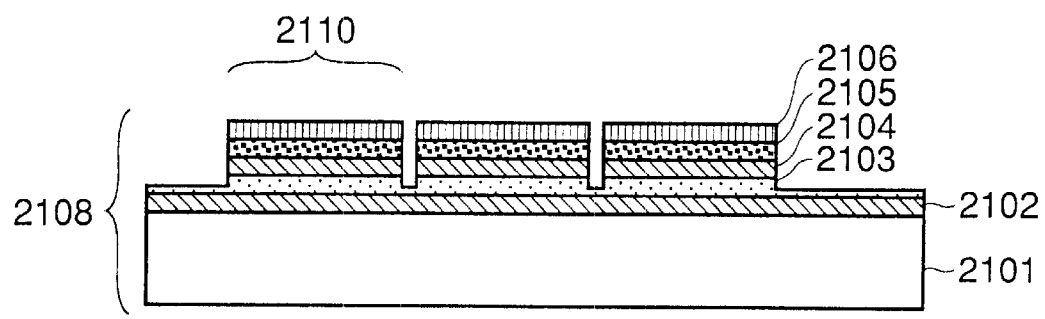
FIG. 10 is a schematic cross sectional view of a recording medium prepared similarly to FIG. 8.
Figure 11A:
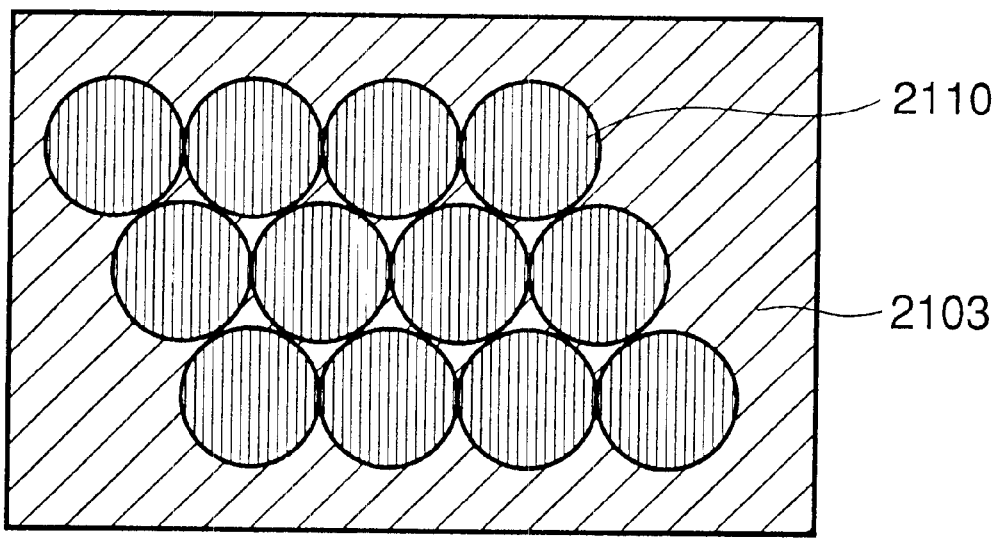
FIG. 11A is a schematic plan view of the recording medium of FIG. 10 showing islands formed on a metal surface and FIG. 11B is a schematic plan view similar to FIG. 11A but showing the islands connected by electrode wiring members.
Figure 11B:
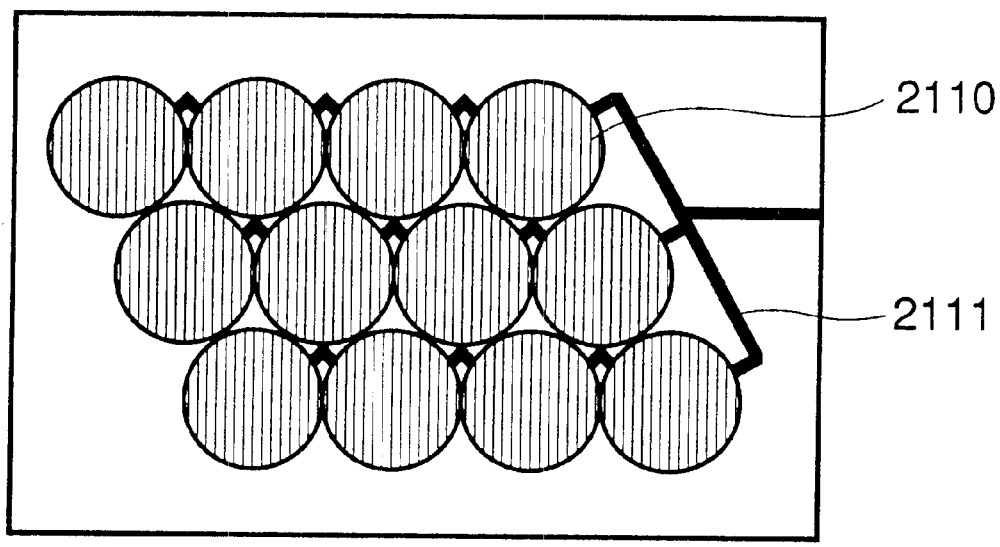

FIG. 10 shows a schematic cross sectional view of such a recording medium and FIGS. 11A and 11B show plan views of the recording medium. The islands may be formed on the surface of a metal layer as shown in FIG. 11A or they may be connected by electrode wiring members 2111 as shown in FIG. 11B. FIGS. 12A through 12I are schematic cross sectional views of a recording medium as shown in FIG. 11A shown in different manufacturing steps, whereas FIGS. 13A through 13J are schematic cross sectional views of a recording medium as shown in FIG. 11B also shown in different manufacturing steps.

Figure 12A:
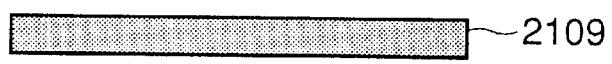
FIGS. 12A, 12B, 12C, 12D, 12E, 12F, 12G, 12H and 12I are schematic cross sectional views of a recording medium as shown in FIG. 11A, shown in different manufacturing steps.
Figure 12B:
Figure 12C:
Figure 12D:
Figure 12E:
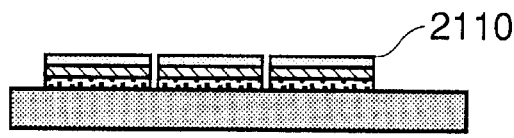
Figure 13A:
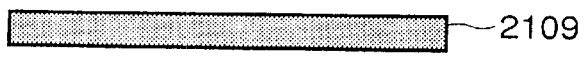
FIGS. 13A, 13B, 13C, 13D, 13E, 13F, 13G, 13H, 13I and 13J are schematic cross sectional views of a recording medium as shown in FIG. 11B, shown in different manufacturing steps.
Figure 13B:

Firstly, a metal electrode layer 2105, a low thermal expansion layer 2104, a high thermal conduction layer 2103 are formed on a first substrate 2109 (FIGS. 12B through 12D, FIGS. 13B through 13D). Then, as shown in FIG. 12E and FIG. 13B, the metal laminate comprising the metal electrode layer 2105, the low thermal expansion layer 2104 and the high thermal conduction layer 2103 is processed to show islands 2110.

Figure 12F:
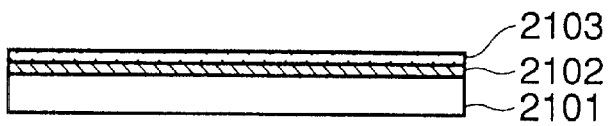
Figure 13C:
Figure 13D:
Figure 13E:
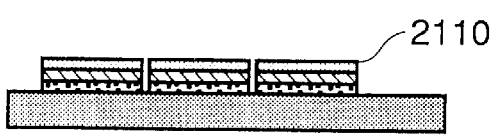
Figure 13F:
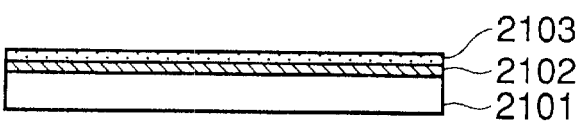

Thereafter, an adherent layer 2102 and a high thermal conduction layer 2103 is formed on a second substrate 2101 (FIG. 12F, FIG. 13F).

Figure 13G:
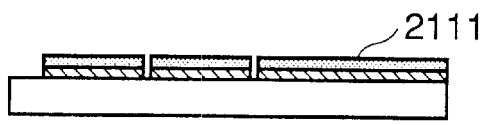

When the islands 2110 are connected by electrode wiring members, the adherent layer 2102 and the high thermal conduction layer 2103 on the second substrate 2101 are processed into wires (FIG. 13G).

Figure 12G:
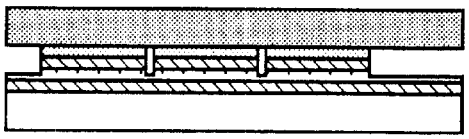
Figure 13H:
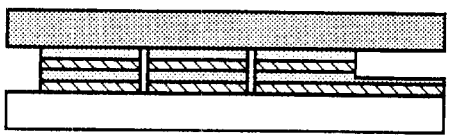

Then, the two substrates are aligned and pressure is applied to them to bond them together as described earlier by referring to FIGS. 9G through 9J (FIG. 12G, FIG. 13H). They may be subjected to a heat treatment process at this time or subsequently.

Figure 12H:
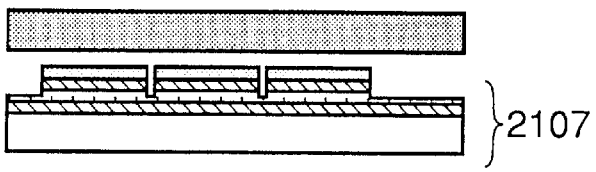
Figure 12I:
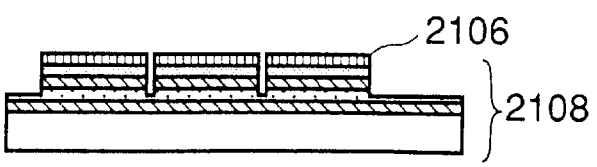
Figure 13I:
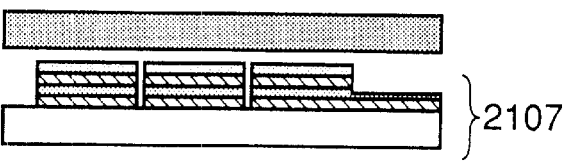
Figure 13J:
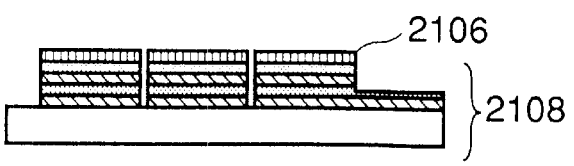

Then, an electrode substrate 2107 is produced as the first substrate 2109 is peeled off the interface of the first substrate 2109 and the metal electrode layer 2105 as shown in FIG. 12H and FIG. 13I. Finally, a recording medium 2108 is produced by forming a recording layer 2106 on the metal electrode layer 2105 (FIG. 12I and FIG. 13J).

Figure 14A:
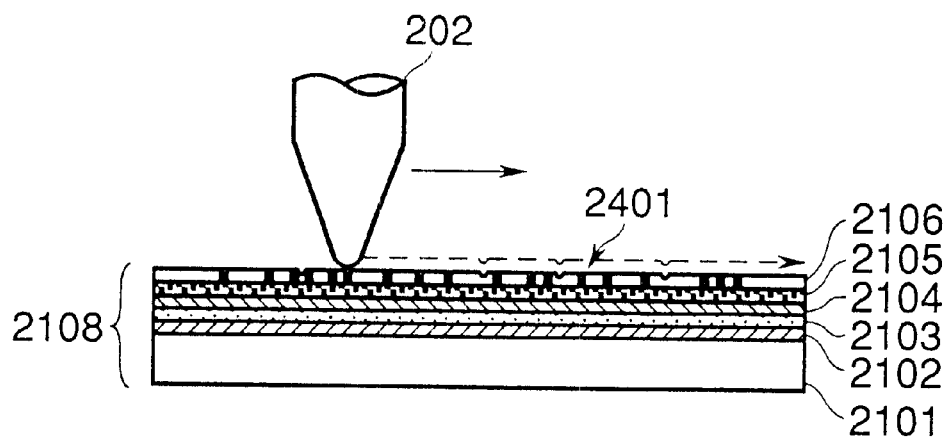
FIG. 14A is a schematic cross sectional view of a second embodiment of recording medium according to the invention and FIG. 14B is a graph showing a frequency spectrum of a signal reproduced from the recording medium of FIG. 14A.
Figure 14B:
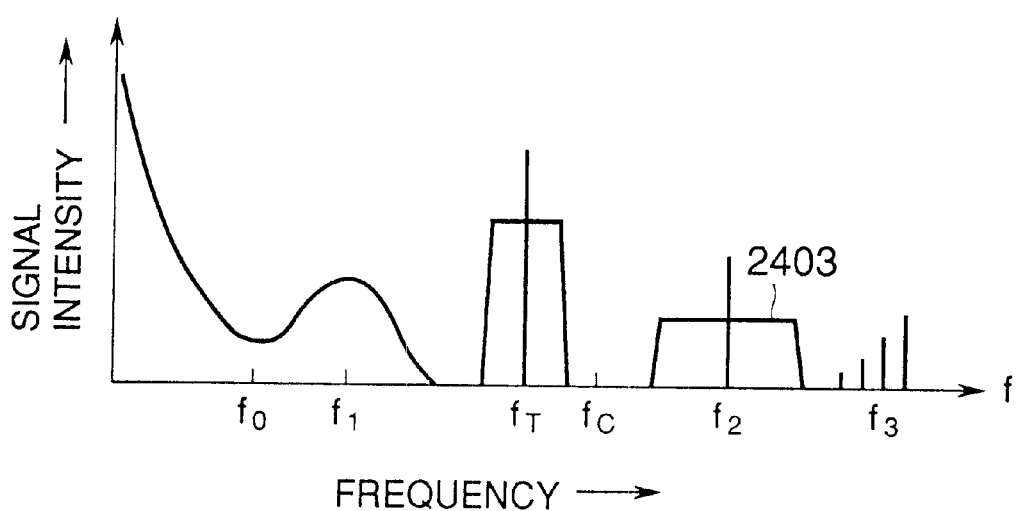

FIGS. 14A and 14B respectively show a schematic cross sectional view of a recording medium 2108 according to the invention and a probe used for an information processing apparatus as shown in FIG. 1 and a graph illustrating the frequency spectrum of a signal obtained at point a in FIG. 1.

Note that the signal portion below f0 represents the mild undulations of the surface of the recording medium due to warps and distortions of the substrate 2101.

The signal portion at f2 represents the carrier wave component of the recorded data and reference numeral 2403 denotes the data signal band. Reference symbol f3 denotes the part of the signal for which the atomic and molecular arrangement of the recording layer 2106 is responsible.

The part of the signal at and around f1 represents the fine surface roughness of the metal electrode layer 2105 transferred from the surface of the first substrate 2109, that are made smaller than the signal to be used for recording data, or 1 nm when the signal is used for recording/reproducing data by means of an STM.

A recording medium having a configuration as described above provides the following effects. The effects due to the excellent surface smoothness include the following.

(1) The signal component f1 attributable to the surface roughness of the recording layer does not come to lie on the data signal band so that the broadening of f1 in the spectrum does not adversely affect the S/N ratio of data. In other words, the recording medium can reduce the data error rate.

(2) Since the surface of the recording layer is practically free from significant surface roughness, the probe is moved little along the Z-axis during an XY scanning operation to keep the distance between the surface of the recording layer and the probe. Therefore, the XY stage can be driven to move very fast.

The metal laminate configuration of the recording layer comprising a metal electrode layer, a low thermal expansion layer, a high thermal conduction layer and an adherent layer provides the following effects.

(1) The thermal expansion of the metal electrode layer can be minimized by arranging the highly smooth metal electrode layer on a low thermal expansion metal layer.

(2) The heat generated between the probe and the recording medium during a data recording/reproducing operation can be dissipated quickly by way of the high thermal conduction layer to minimize the temperature rise and the thermal expansion of the recording medium.

(3) The heat radiating effect of the recording medium can be improved by arranging islands on the surface of the recording medium.

(4) The reduction in the smoothness of the metal electrode layer due to the diffusion of the high thermal conduction layer to the metal electrode layer can be minimized by the existence of the low thermal expansion layer that prevents diffusion of the high thermal conduction layer to the metal electrode layer.

The effect of suppressing thermal expansion of the recording medium is very important and indispensable for the operation of recording/reproducing data on the order of nanometer.

Additionally, a method of manufacturing an electrode substrate according to the invention provides the following advantages.

(1) A highly heat-resistive electrode substrate can be prepared because metal is used for a bonding layer. Therefore, layers such as a recording layer can be formed on the electrode substrate, keeping the surface very smooth, at temperatures by far higher than the temperature range used for the prior art.

(2) Since a thin metal film layer is used as bonding layer, oozing out of adhesives from the surfaces to be bonded together is eliminated, which is often experienced in its counterpart of the prior art using an organic adhesive agent applied to the surfaces.

(3) The use of the thin metal film layer that operates as bonding layer makes it easy to control the height of the surface of the metal electrode layer from the surface of the substrate carrying the layer thereon and the parallelism of the surface of the substrate and that of the electrode layer if compared with its counterpart of the prior art, which uses typically an organic adhesive agent applied to the surfaces.

(4) Any substrate material can be used if it is adapted to form a bonding layer via a metal layer, whereby a smooth metal electrode layer is formed.

(5) The recording medium can maintain its clean surface during the transfer and forming process because the surface is not exposed to resist and/or exfoliating solution during the operation of forming islands of the metal electrode layer.

Now, a method of smoothing the surface of crystalline gold surface for the purpose of the invention will be described by way of examples.

EXAMPLE 5

This example will be described by referring to FIGS. 9A through 9J.

Firstly, a first substrate 2109 was prepared to show a satisfactory surface smoothness as shown in FIG. 9A. An Si wafer carrying thereon a 100 nm thick thermal oxide film was used for the substrate.

Then, as shown in FIG. 9B, an alloy layer of Au and Pt was formed on the first substrate 2109 by means of sputtering to produce a metal electrode layer 2105. The operation of forming the electrode layer 2105 was conducted at a deposition rate of 0.1 nm/sec to produce a film thickness of 60 nm.

Thereafter, as shown in FIG. 9C, a low thermal expansion layer 2104 of W was formed on the metal electrode layer 2105 at a deposition rate of 0.5 nm/sec to a film thickness of 500 nm. Subsequently, as shown in FIG. 9D, a high thermal conduction layer 2103 of Au was formed on the low thermal expansion layer 2104 to a film thickness of 100 nm.

Thereafter, as shown in FIG. 9E, an adherent layer 2102 of Cr was formed on a second substrate 2101 of an Si wafer to a film thickness of 5 nm and then, as shown in FIG. 9F, another high thermal conduction layer 2103 of Au was formed on the adherent layer 2102 to a film thickness of 100 nm.

Then, as shown in FIGS. 9G and 9H, the bonding surface of the first substrate 2109 and that of the second substrate 2101 were put together, applying pressure to the substrates. The applied pressure was 5 kg/cm$^2$. Thereafter, the substrates were heated to 250° C. for 60 seconds, while keeping the pressure being applied to them and then cooled to room temperature.

Subsequently, the first substrate 2109 was peeled off at the interface with the metal electrode layer 2105 to produce an electrode substrate 2107 having a very smooth surface as shown in FIG. 9I. When the electrode surface of the obtained electrode substrate 2107 was observed through an STM, the surface undulations per 1 $\mu$m$^2$ were less than 1 nm.

Thereafter, as shown in FIG. 9J, a polyimide LB film was formed on the surface of the metal electrode layer 2105 as a recording layer 2106 to finish the operation of preparing a recording medium 2108.

A method as disclosed in Japanese Patent Application Laid-Open No. 63-161552 was used to prepare the polyimide LB film. More specifically, octadecylamine salt of polyamidoic acid was used as material and a total of six monomolecular layers of the compound were formed on the electrode surface, which layers were then baked at 350° C. for 20 minutes to produce a polyimide recording layer.

When the surface of the obtained recording layer was observed by AFM, it was confirmed that the surface undulations per 1 $\mu$m$^2$ was less than 1 nm. Then, the specimen was subjected to a recording/reproducing test.

A probe made of Pt/Rh was used for the probe 202. The probe 202 was controlled by means of a piezoelectric element for its fine movement of regulating the distance Z down to the surface of the recording layer 2106 in order to make a constant current flow therethrough. The linear actuators 204, 205 and 206 were designed to control the fine movement of the probe 202 along an XY plane, while keeping the distance between the probe 202 and the surface of the recording layer 2106 to a constant value. The recording medium 2108 was placed on the XY stage.

Then, a voltage of +1.5V was applied between the probe 202 and the electrode layer 2105 of the recording medium and the distance Z between the probe 202 and the recording layer 2106 was regulated, monitoring the electric current flowing therethrough. The electric current Ip for controlling the distance Z between the probe 202 and the surface of the recording layer 2106 as selected to be $10^{-10} \geq Ip \geq 10^{-11}$.

Thereafter, the probe 202 was caused to scan the recording layer 2106 from above and record data continuously at a pitch of 20 nm by applying a rectangular pulse voltage.

The probe was used as positive electrode while the electrode layer was used as negative electrode for recording. Subsequently, the recorded bits were scanned from above to find that an electric current of about 10 nA flowed on each bit.

The error rate of the read out data was determined, keeping on the scanning operation for a long period of time to find that a very low error rate could be realized due to-the smoothness of the substrate and the effect of dissipating heat and suppressing thermal expansion during the data recording/reproducing operation.

EXAMPLE 6

This example will be described by referring to FIGS. 12A through 12I.

Firstly, a first substrate 2109 was prepared from a piece of float glass having a satisfactory surface smoothness as shown in FIG. 12A.

Then, as shown in FIG. 12B, Au and Pd were sputtered concurrently on the first substrate 2109 to produce a metal electrode layer 2105 on the substrate 2109. The metal electrode layer 2105 was formed at a deposition rate of 0.2 nm/sec to a film thickness of 100 nm.

Thereafter, as shown in FIG. 12C, a low thermal expansion layer 2104 of Ta was formed on the metal electrode layer 2105 at a deposition rate of 0.4 nm/sec to a film thickness of 600 nm.

Subsequently, as shown in FIG. 12D, a high thermal conduction layer 2103 of Al was formed on the low thermal expansion layer 2104 to a film thickness of 100 nm. Then, as shown in FIG. 12E, the metal laminate on the first substrate 2109 was processed by dry etching to produce islands 2110.

Then, as shown in FIG. 12F, a high thermal conduction layer 2103 of Al operating also as an adherent layer 2102 was formed on a second substrate 2101 of an Si wafer to a film thickness of 100 nm.

Thereafter, as shown in FIG. 12G, the bonding surface of the first substrate 2109 and that of the second substrate 2101 were put together, applying pressure to the substrates. The applied pressure was 6 kg/cm².

Thereafter, the substrates were heated to 450° C. for 2 minutes, while keeping the pressure being applied to them and then cooled to room temperature.

Subsequently, the first substrate 2109 was peeled off at the interface with the metal electrode layer 2105 to produce an electrode substrate 2107 having a very smooth surface as shown in FIG. 12H.

When the electrode surface of the obtained electrode substrate 2107 was observed through an STM, the surface undulations per 1 µm² were less than 1 nm.

Thereafter, as in the case of Example 5, a polyimide LB film was formed on the surface of the metal electrode layer 2105 as a recording layer 2106 to finish the operation of preparing a recording medium 2108 (FIG. 12I).

When the surface of the obtained recording layer was observed by AFM, it was confirmed that the surface undulations per 1 µm² was less than 1 nm.

Then, the specimen was subjected to a recording/reproducing test.

The error rate of the read out data was determined as in the case of Example 5, keeping on the scanning operation for a long period of time to find that a very low error rate could be realized due to the smoothness of the substrate and the effect of dissipating heat and suppressing thermal expansion during the data recording/reproducing operation.

EXAMPLE 7

This example will be described by referring to FIGS. 13A through 13J.

Firstly a first substrate 2109 was prepared from a piece of float glass having a satisfactory surface smoothness as shown in FIG. 13A.

Then, as shown in FIG. 13B, Pt was sputtered on the first substrate 2109 to produce a metal electrode layer 2105 on the substrate 2109. The metal electrode layer 2105 was formed at a deposition rate of 0.2 nm/sec to produce a film thickness of 400 nm.

Thereafter, as shown in FIG. 13C, a low thermal expansion layer 2104 of Ta was formed on the metal electrode layer 2105 at a deposition rate of 0.4 nm/sec to produce a film thickness of 600 nm.

Subsequently, as shown in FIG. 13D, a high thermal conduction layer 2103 of Au was formed on the low thermal expansion layer 2104 to a film thickness of 100 nm.

Then, as shown in FIG. 13E, the metal laminate on the first substrate 2109 was processed by dry etching to produce islands 2110.

Then, as shown in FIG. 13F, an adherent layer 2102 of Cr was formed on a second substrate 2101 of an Si wafer to a film thickness of 5 nm and a high thermal conduction layer 2103 of Au was formed on the adherent layer 2102 to a film thickness of 100 nm.

Then, as shown in FIG. 13G, the adherent layer 2102 and the high thermal conduction layer 2103 were patterned to produce electrode wiring members 2111.

Thereafter, as shown in FIG. 13H, the bonding surface of the first substrate 2109 and that of the second substrate 2101 were put together, applying pressure to the substrates. The applied pressure was 3 kg/cm².

Thereafter, the substrates were heated to 200° C. for 10 seconds, while keeping the pressure being applied to them and then cooled to room temperature.

Subsequently, the first substrate 2109 was peeled off at the interface with the metal electrode layer 2105 to produce an electrode substrate 2107 having a very smooth surface as shown in FIG. 13I.

When the electrode surface of the obtained electrode substrate 2107 was observed through an STM, the surface undulations per 1 µm² were less than 1 nm.

Thereafter, as in the case of Example 5, a polyimide LB film was formed on the surface of the metal electrode layer 2105 as a recording layer 2106 to finish the operation of preparing a recording medium 2108 (FIG. 13J).

When the surface of the obtained recording layer was observed by AFM, it was confirmed that the surface roughness per 1 µm² was less than 1 nm.

Then, the specimen was subjected to a recording/reproducing test.

The error rate of the read out data was detected as in the case of Example 5, keeping on the scanning operation for a long period of time to find that a very low error rate could be realized due to the smoothness of the substrate and the effect of dissipating heat and suppressing thermal expansion during the data recording/reproducing operation.

(Third Mode of Carrying Out the Invention)

Now, the present invention will be described in terms of a third mode of carrying it out.

FIGS. 15A through 15G are schematic cross sectional views of an electrode substrate and a recording medium prepared according to a third mode of carrying out the invention, shown in different manufacturing steps.

Figure 15A:
FIGS. 15A, 15B, 15C, 15D, 15E, 15F and 15G are schematic cross sectional views of a recording medium prepared according to a third mode of carrying out the invention, shown in different manufacturing steps.

FIG. 15A shows a first substrate 3101. The substrate is required to have a smooth surface area greater than 1 $\mu m^2$ where surface roughness does not exceed 0.5 nm. The surface roughness of the surface can be determined by means of atomic force microscopy (hereinafter referred to as AFM).

With AFM, the surface of the specimen can be observed with a level of resolution on the order of the size of an atom regardless if the specimen is electroconductive or not.

As a result of a series of researches, the inventors of the present invention found that materials that can suitably be used for the first substrate 3101 according to the invention include the following.

(1) cleavage plane of a crystal . . . A cleavage plane of a crystal provides a very smooth surface. Materials that can be used to provide a crystal having a cleavage plane for the purpose of the invention include MgO, TiC, Si, mica and HOPG.

(2) surface of molten glass . . . Glass materials that can be used to provide a very smooth surface of molten glass for the purpose of the invention include float glass and #7059 fused quartz.

(3) others . . . For example, a thermal oxide film of Si formed on a sufficiently smooth surface of an Si wafer can be used to provide a very smooth surface for the purpose of the invention.

Figure 15B:
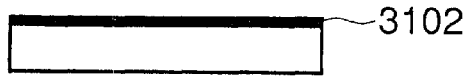

Then, an exfoliation layer 3102 is formed on the first substrate 3101 as shown in FIG. 15B.

For example, the exfoliation layer 3102 may be formed as an organic monomolecular film of molecules or a built-up film comprising a number of such monomolecular films typically prepared by means of an LB (Langmuir-Blodgett) technique. Since an organic monomolecular film of such molecules or a built-up film of such monomolecular films prepared by means of an LB technique can accurately reproduce the surface smoothness of the substrate, a smooth surface can be obtained on the first substrate 3101 without damaging the surface smoothness of the first substrate 3101.

Figure 15C:
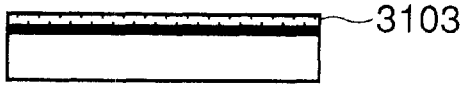

Then, a recording layer 3103 is formed on the exfoliation layer 3102 as shown in FIG. 15C.

For example, the recording layer 3103 may be formed as a chalcogenide thin film typically by sputtering.

Chalcogenide thin films have already found practical applications in phase-changing type optical discs. A phase-changing type optical disc can record data as it reversibly changes its phase when the chalcogenide thin film of the disc is irradiated with a laser beam under certain conditions and reproduce the data recorded as the optical change of the disc is read as a function of the change in its phase. Meanwhile, it is also known that chalcogenide thin film changes its electroconductivity when a voltage is applied thereto (Japanese Patent Application Laid-Open No. 63-222348).

Figure 15D:

Subsequently, a metal layer 3104 is formed on the recording layer 3103 as shown in FIG. 15D. The metal layer 3104 is made of an electrically highly conductive material. Materials that can preferably be used for the metal layer 3104 include noble metals such as Au, Pt, Pd, Ir, Rh and Ru and alloys of any of them. The metal layer 3104 that is held in contact with the recording layer 3103 is required to hardly form an oxide film thereon. An additional metal layer may be formed on the metal layer that hardly produces an oxide film. Metals that can be used for such an additional layer include W, Ta, Ti, Cr, Al, Cu and Ag because they are not costly and have a small thermal expansion coefficient. Preferably, a layer containing Au as principal ingredient is formed on top. The use of Au for the top layer is preferable since Au is soft and has a low melting point, it can be bonded with some other layer under low pressure and at low temperature. Any known thin film forming technique may be used for forming a thin film of such a material.

Figure 15E:

Then, as shown in FIG. 15E, a metal layer 3106 is formed on a second substrate 3105. Materials that can be used for the metal layer 3106 include noble metals such as Pt, Pd, Ir, Rh, Ru and Au and alloys of any of them as well as metals such as W, Ta, Ti, Cr, Al, Cu and Ag. A laminate of such metals may be used for the purpose of the invention. Preferably a layer containing Au as principal ingredient is formed on top.

Figure 15F:
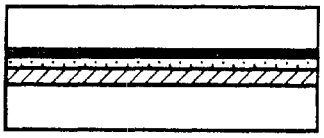

Then, as shown in FIG. 15F, the first substrate 3101 and the second substrate 3105 are put together with the sides carrying respective metal layers facing each other and high pressure is applied to them to bond the layers. While the pressure has no specific limit, it is typically between several and tens of several kg/cm$^2$.

The bonding operation may be conducted under relatively low pressure if the layers are heat treated. While the temperature of the heat treatment may vary as a function of the pressure involved, it is typically below 1,000° C. The heat treatment and the pressurization are preferably conducted simultaneously, although the two operations may be carried out separately.

Figure 15G:
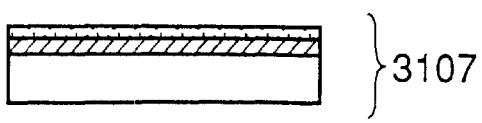

Thereafter, the first substrate 3101 is peeled off as shown in FIG. 15G.

As a matter of fact, the first substrate 3101 is peeled off along the interface of the exfoliation layer 3102 and the recording layer 3103. If the exfoliation layer 3102 is left, if partly, on the recording layer, it can be removed with ease by means of oxygen plasma. Then, a recording medium 3107 is obtained as a result.

The recording layer shows a surface smoothness equal to the surface smoothness of the first substrate 3101 and hence it has a smooth surface area greater than 1 $\mu m^2$ where surface roughness does not exceed 1 nm.

Figure 16A:
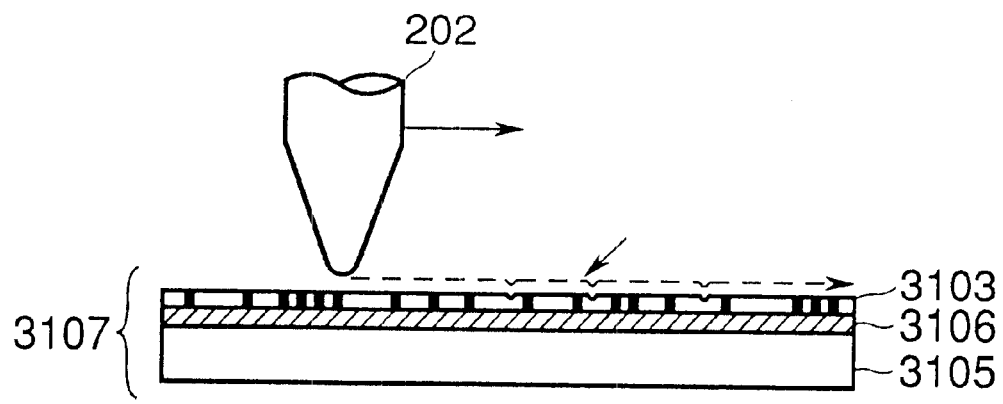
FIG. 16A is a schematic cross sectional view of a third embodiment of recording medium according to the invention and FIG. 16B is a graph showing the frequency spectrum of a signal reproduced from the recording medium of FIG. 15A.
Figure 16B:
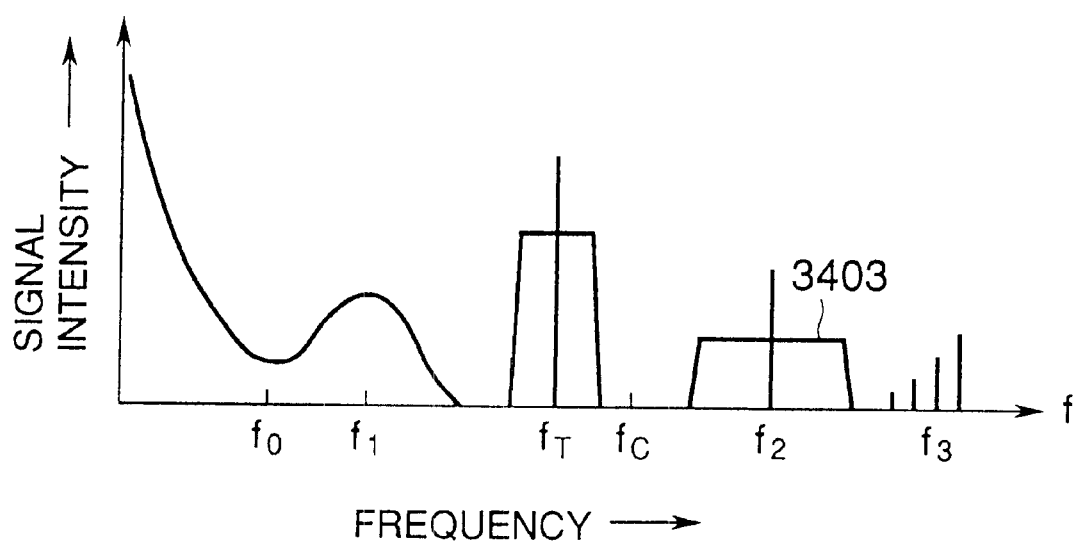

FIG. 16A shows a schematic cross sectional view of a recording medium 3107 according to this mode of carrying out the invention and a probe used for an information processing apparatus as shown in FIG. 1. FIG. 16B shows a graph illustrating a frequency spectrum of a signal obtained at points a and b in FIG. 1.

The signal portion below f0 represents the mild undulations of the surface of the recording medium due to the warps and distortions of the recording medium 3107.

The signal portion at f2 represents the carrier wave of the recorded data and reference numeral 3403 denotes the data signal band. Reference symbol f3 denotes the part of the signal for which the atomic and molecular arrangement of the recording layer 3103 is responsible.

The part of the signal at and around f1 represents the fine surface roughness transferred from the surface of the first substrate 3101. Note that f1 should be held as low as possible because the tops and bottoms should be made smaller than the cut-off frequency fc of the high-pass filter 307 and the frequency of tracking signal fT. Particularly, in the case of an ultra-large capacity memory on the level of tera-bits, it has to be scanned at a greater speed with the probe of an STM.

However, f1 increases as the scanning speed is raised and becomes close to fc to consequently interfere with a high speed scanning operation.

Therefore, it is vital for a recording medium of the type under consideration to use a very smooth substrate in order to provide a small f1 portion.

Thus, the third mode of carrying out the invention provides the following effects.

1. A recording medium having a very smooth surface can minimize the signal component f1 attributable to the surface roughness of a recording layer so that the signal component f1 can be held sufficiently smaller than the signal component fc at a very high scanning speed.

2. Since the recording medium comprises layers of inorganic materials and metal layers, the obtained electrode substrate is thermally highly resistive.

3. The method is simple because the recording layer and the metal layer (electrode layer) can be collectively transferred.

4. Since a metal layer is used as bonding layer, oozing out of adhesives from the surfaces to be bonded together is eliminated, which is often experienced in its counterpart of the prior art using an organic adhesive agent applied to the surfaces.

5. The use of the metal layer that operates as bonding layer makes it easy to control the height of the surface of the metal electrode layer from the surface of the substrate carrying the layer thereon and the parallelism of the surface of the substrate and that of the electrode layer if compared with its counterpart of the prior art, which uses typically an organic adhesive agent applied to the surfaces.

6. Any substrate material can be used if it is adapted to form a bonding layer via a metal layer, whereby a smooth metal electrode layer.

Now, a method of smoothing the surface of crystalline gold surface for the purpose of the invention will be described by way of examples.

EXAMPLE 8

This example will be described by referring to FIGS. 15A through 15G.

Firstly, a first substrate 3101 was prepared from an Si wafer (111) processed for smoothing as shown in FIG. 15A.

In the smoothing process, the wafer was immersed firstly in a 4:1 boiling solution of sulfuric acid and hydrogen peroxide for 5 minutes and then in a 5% fluoric acid solution for 1 minute. Thereafter, it was further immersed in a 3:50 solution of fluoric acid and ammonium fluoride for 10 minutes before it was washed with water and dried.

Then, as shown in FIG. 15B, a built-up film of alkylamine salt of polyamic acid was formed on the first substrate 3101 by a method as disclosed in Japanese Patent Application Laid-Open No. 63-161552 (LB method). The built-up film was then baked at 250° C. for 30 minutes to turn it into polyimide to produce an exfoliation layer 3102. The obtained exfoliation layer 3102 was examined for surface roughness by means of AFM to find that it was less than 0.3 nm per 1 $\mu m^2$.

Thereafter, a 20 nm thick chalcogenide thin film (GeSb$_2$Te$_4$) was formed on the exfoliation layer 3102 for a recording layer 3103 by means of bifunctional sputtering as shown in FIG. 15C.

Then, as shown in FIG. 15D, a layer of an alloy of Pt and Au was formed on the recording layer 3103 to a film thickness of 300 nm and then a 50 nm thick Au layer was formed thereon to combinedly produce a metal layer 3104.

Subsequently, as shown in FIG. 15E, a 5 nm thick Cr film and a 100 nm thick Au layer were sequentially formed on a second substrate 3105 of an Si wafer to combinedly produce a metal layer 3106.

Then, as shown in FIG. 15F, the metal layer 3104 on the first substrate 3103 and the metal layer 3106 on the second substrate 3105 were put together, applying pressure to the substrates. The applied pressure was 5 kg/cm$^2$. Thereafter, the substrates were heated to 200° C. for 10 seconds, while keeping the pressure being applied to them and then cooled to room temperature.

Subsequently, the first substrate 3101 was peeled off at the interface of the exfoliation layer 3102 and the recording layer 3103 to produce a recording medium 3107 having a very smooth surface as shown in FIG. 15G. When the surface of the obtained recording layer 3103 was observed by means of AFM, the surface roughness per 1 $\mu m^2$ was less than 0.3 nm.

Then, the specimen was subjected to a recording/reproducing test.

A probe made of Pt/Rh was used for the probe 202. The probe 202 was controlled by means of a piezoelectric element for its fine movement of regulating the distance Z down to the surface of the recording layer 3103 in order to make a constant current flow therethrough. The linear actuators 204, 205 and 206 were designed to control the fine movement of the probe 202 along an XY plane, while keeping the distance Z to a constant value. The recording medium 3108 was placed on the XY stage. Then, a voltage of +1.0V was applied between the probe 202 and the electrode layer 3102 of the recording medium and the distance Z between the probe 202 and the recording layer 3103 was regulated, monitoring the electric current flowing therethrough. The electric current Ip for controlling the distance Z between the probe 202 and the surface of the recording layer 3103 as selected to be $10^{-10} \geq Ip \geq 10^-$. Thereafter, the probe 202 was caused to scan the recording layer 3103 from above and record data continuously at a pitch of 20 nm by applying a rectangular pulse voltage, using the probe as positive electrode and the electrode layer as negative electrode. Subsequently, the recorded bits were scanned from above to find that an electric current of about 10 nA flowed on each bit. The error rate of the read out data was determined, using a constant data reading rate to find that it was as low as $10^{-7}$ if compared with the average error rate of about $10^{-1}$ of the prior art.

EXAMPLE 9

This example will be described by referring to FIGS. 15A through 15G.

Firstly, a first substrate 3101 was prepared from a piece of float glass having a satisfactory surface smoothness as shown in FIG. 15A.

Then, as shown in FIG. 15B, a built-up film of alkylamine salt of polyamic acid was formed on the first substrate 3101 by an LB method. The built-up film was then baked at 250° C. for 30 minutes to turn it into polyimide to produce an exfoliation layer 3102. The obtained exfoliation layer 3102 was examined for surface roughness by means of AFM to find that less than 0.3 nm per 1 $\mu m^2$.

Thereafter, a 20 nm thick chalcogenide thin film (GeSb$_2$Te$_4$) was formed on the exfoliation layer 3102 for a recording layer 3103 by means of bifunctional sputtering as shown in FIG. 15C.

Then, as shown in FIG. 15D, a layer of an alloy of Pd and Au was formed on the recording layer 3103 to a film thickness of 300 nm and then a 50 nm thick Au layer was formed thereon to combinedly produce a metal layer 3104.

Subsequently, as shown in FIG. 15E, a 5 nm thick Cr film and a 100 nm thick Au layer were sequentially formed on a second substrate 3105 of an Si wafer to combinedly produce a metal layer 3106.

Then, as shown in FIG. 15F, the metal layer 3104 on the first substrate 3103 and the metal layer 3106 on the second substrate 3105 were put together, applying pressure to the substrates. The applied pressure was 10 kg/cm$^2$.

Subsequently, the first substrate 3101 was peeled off at the interface of the exfoliation layer 3102 and the recording layer 3103 to produce a recording medium 3107 having a very smooth surface as shown in FIG. 15G. When the surface of the obtained recording layer 3103 was observed by means of AFM, the surface roughness per 1 $\mu$m$^2$ was less than 0.3 nm.

Then, the specimen was subjected to a recording/reproducing test as in the case of Example 8 to detect the error rate of the read out data, using a constant data reading rate. It was found that it was as low as 10$^{-7}$ if compared with the average error rate of about 10$^{-1}$ of the prior art.

EXAMPLE 10

This example will be described by referring to FIGS. 15A through 15G.

Firstly, an Si wafer subjected to a smoothing process was used for a first substrate 3101 as in the case of Example 8 and then a built-up film of alkylamine salt of polyamic acid was formed on the first substrate 3101 by an LB method. The built-up film was then chemically treated to turn it into polyimide to produce an exfoliation layer 3102.

The obtained exfoliation layer 3102 was examined for surface roughness by means of AFM to find that it was less than 0.3 nm per 1 $\mu$m$^2$.

Thereafter, a 20 nm thick chalcogenide thin film (GeSb$_2$Te$_4$) was formed on the exfoliation layer 3102 for a recording layer 3103 by means of bifunctional sputtering. Then, a 500 nm thick Pt layer was formed on the recording layer 3103 and then a 100 nm thick Al layer was formed thereon to combinedly produce a metal layer 3104.

Subsequently, a 5 nm thick Cr film and a 100 nm thick Al layer were sequentially formed on a second substrate 3105 of an Si wafer to combinedly produce a metal layer 3106. Then, the metal layer 3104 on the first substrate 3103 and the metal layer 3106 on the second substrate 3105 were put together, applying pressure to the substrates. The applied pressure was 10 kg/cm$^2$. After the application of pressure, they were heated at 300° C. for 1 minute.

Subsequently, the first substrate 3101 was peeled off at the interface of the exfoliation layer 3102 and the recording layer 3103 to produce a recording medium 3107 having a very smooth surface. When the surface of the obtained recording layer was observed by means of AFM, the surface roughness per 1 $\mu$m$^2$ was less than 0.3 nm.

Then, the specimen was subjected to a recording/reproducing test as in the case of Example 1 to detect the error rate of the read out data, using a constant data reading rate. It was found that it was as low as 10$^{-7}$ if compared with the average error rate of about 10$^{-1}$ of the prior art.

What is claimed is:

1. A method of manufacturing an electrode substrate having a metal electrode layer comprising the steps of:

forming a metal electrode layer on a first substrate;

bonding said first substrate to a second substrate to form a combined body having a layered structure on said first substrate, said layered structure comprising said metal electrode layer, a low thermal expansion layer having a thermal expansion coefficient lower than said metal electrode layer, and a high thermal conduction layer having a thermal conductivity higher than said low thermal expansion layer; and peeling said first substrate off said metal electrode layer.

2. A method according to claim 1, wherein said metal electrode layer is made of one or more than one noble metals.

3. A method according to claim 2, wherein said metal electrode layer is made of a material selected from Au, Pt, Pd, Ir, Rh and Ru and alloys of any of them.

4. A method according to claim 1, wherein said low thermal expansion layer is made of a material selected from W, Ta, Mo, Cr, Ti and Zr and alloys of any of them as well as their compounds.

5. A method according to claim 1, wherein said high thermal conduction layer is made of a material selected from Au, Ag, Cu and Al and alloys of any of them.

6. A method according to claim 1, wherein said adherent layer of metal is made of a laminate film having two or more than two layers of noble metal and base metal.

7. A method according to claim 1, wherein said bonding step comprises pressurizing said combined body and conducting heat treatment.

8. A method of manufacturing an electrode substrate having a metal electrode layer, characterized by comprising steps of:

forming a metal electrode layer on a first substrate;

bonding said first substrate and a second substrate to form a combined body having a layered structure on said first substrate, said layered structure comprising said metal electrode layer, a first layer comprising at least one selected form W, Ta, Mo, Cr, Ti and Zr and alloys of any of them as well as their compounds, and a second layer comprising at least one selected from Au, Ag, Cu and Al and alloys of any of them; and peeling said first substrate off said metal electrode layer.

* * * * *

UNITED STATES PATENT AND TRADEMARK OFFICE
CERTIFICATE OF CORRECTION

PATENT NO.   : 6,475,321 B1
DATED        : November 5, 2002
INVENTOR(S)  : Tsutomu Ikeda et al.

It is certified that error appears in the above-identified patent and that said Letters Patent is hereby corrected as shown below:

Column 1,
Line 15, "paid" should read -- made --;
Line 22, "include" should read -- include: --;
Line 25, "rate and" should read -- rate, and --;
Line 30, "main stream," should read -- mainstream, --; and
Line 38, "Binnig" should read -- Binning --.

Column 2,
Line 3, "a n" should read -- a $\pi$ --.

Column 4,
Lines 1, 9, 22, 26, 39, 43, 46 and 52, "cross sectional" should read
-- cross-sectional --; and
Lines 14 and 18, "cross" should read -- cross- --.

Column 5,
Line 1, "cross sectional" should read -- cross-sectional --.

Column 7,
Line 48, "minutes," should read -- minute, --.

Column 9,
Line 45, "1 m$^2$" should read -- 1$\mu$m$^2$ --.

Column 10,
Lines 37 and 45, "cross sectional" should read -- cross-sectional --.

Column 12,
Lines 18 and 20, "cross sectional" should read -- cross-sectional --.

Column 14,
Line 6, close up right margin; and
Line 7, close up left margin.

Column 15,
Line 21, "to-the" should read -- to the --.

UNITED STATES PATENT AND TRADEMARK OFFICE
CERTIFICATE OF CORRECTION

PATENT NO. : 6,475,321 B1
DATED : November 5, 2002
INVENTOR(S) : Tsutomu Ikeda et al.

It is certified that error appears in the above-identified patent and that said Letters Patent is hereby corrected as shown below:

Column 16,
Line 5, "was" should read -- were --.

Signed and Sealed this

Seventh Day of October, 2003

JAMES E. ROGAN
*Director of the United States Patent and Trademark Office*